Patented May 26, 1936

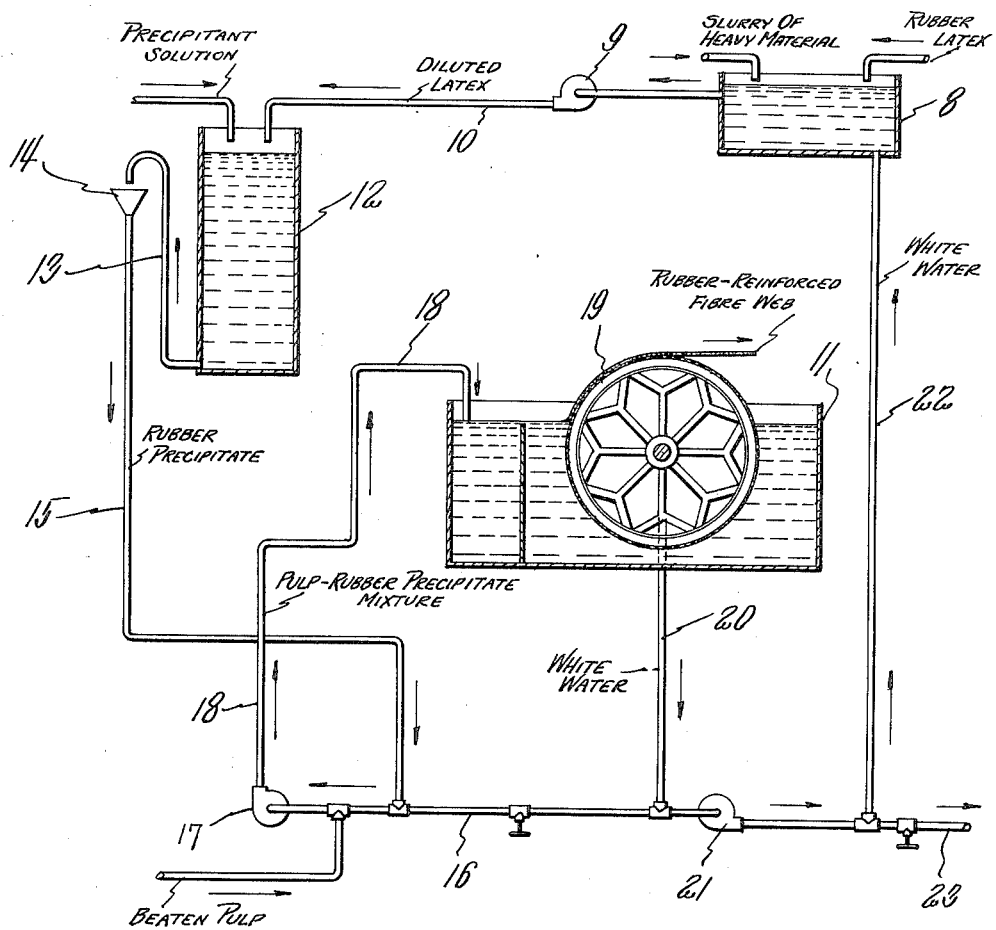

2,041,968

UNITED STATES PATENT OFFICE 2,041,968

MANUFACTURE OF RUBBER-REENFORCED WATERLAID WEBS OF FIBER

Milton O. Schur, Berlin, N. H., assignor to Brown Company, Berlin, N. H., a corporation of Maine Application May 16, 1934, Serial No. 725,945

26 Claims. (Cl. 92—21)

This invention relates to the manufacture of rubber-reenforced waterlaid webs of fibers having a wide variety of technical applications. The expression "waterlaid web of fibers" as used herein is meant to include those webs or felts that are made on machinery of the paper-making type from aqueous suspensions of fibers, such as wood pulp, rag halfstuff, wool, asbestos, rayon, animal hair, etc., or fiber mixtures. An objective of the present invention is to provide an advantageous and economical practice of using rubber latex as a raw material in the manufacture of the rubber-reenforced sheet material of the present invention.

In making rubber-reenforced sheet products wherein the fibers exist in a waterlaid interfelted condition, two practices have heretofore been most frequently used. One practice involves preparing a bibulous or absorptive waterlaid web, impregnating the web with rubber latex, and drying the impregnated web to coagulate the rubber. The other practice involves adding the rubber latex to the aqueous suspension of fibers as in the beater engine, precipitating the rubber on the fibers by the addition of suitable coagulants, and delivering the suspension to the web-making machine. Both these practices suffer practical drawbacks. Thus, the after-impregnation of a web with rubber latex followed by drying is accompanied by a tendency of the rubber particles to migrate to the surface of the sheet during the drying operation, resulting in a non-uniform product. Again, the after-impregnation requires expensive equipment to supplement the web-making machine. The incorporation of rubber latex into an aqueous suspension of fibers followed by the precipitation of the rubber on the fibers preparatory to web formation is apt to give rise to a non-uniform fiber and rubber precipitate mixture, unless most carefully performed, especially when a comparatively large amount of rubber is to be combined with the fiber. When such precipitation is performed in the beater engine wherein the precipitated rubber and fibers are in a state of marked turbulence, the precipitated rubber tends to form lumps or strings that may stick to and foul the equipment through which the suspension passes on its way to the web-forming machine.

In accordance with the present invention, the rubber is precipitated in the rubber latex in the substantial absence of fibers to produce a rubber precipitate in aqueous suspension, whereupon a stream of such rubber precipitate is progressively merged with the stream of aqueous suspension of the fibers on its way to the web-forming machine to produce a mixture of the desired dilution and fiber-to-rubber ratio for forming into the web. Inasmuch as the web can be formed satisfactorily only from highly dilute suspensions of fibers, that is, from suspensions of a fiber content of only about 2% or lower, it is obvious that the merging or joining of the stream of rubber precipitate and the aqueous suspension of fibers is done under conditions where a uniform mixture of the two streams may easily be realized under such mild mixing action as not to give rise to the formation of lumps or strings of rubber. On the contrary, the mixed stream is of a homogeneous or uniform character such that when delivered to the web-forming machine a rubber-reenforced sheet practically devoid of undesirably lumpy or stringy rubber is produced. The merging of the streams may be effected to best advantage at that point in the system where the aqueous suspension of fibers has already been beaten and otherwise been prepared for delivery to the web-forming machine, the stream of rubber precipitate, for instance, being added to the suspension of fibers just before being pumped to the head-box of the web-forming machine. A considerable part of the water necessary for reducing the suspension of fibers to the proper web-making consistency may be furnished by the stream of rubber precipitate which may advantageously be produced at a high state of dilution, say, at a rubber content of less than 5%. Indeed, it is preferable to work with a stream of rubber precipitate which has been produced at a rubber content not exceeding about 1 to 2%, as the desired precipitation of the rubber latex is promoted by diluting the latex greatly with water either before or during the addition of suitable precipitant thereto. In view of the conditions under which the rubber is precipitated, I prefer to use as the diluting water for the latex and the precipitant added thereto the white water removed during the web-forming operation as this leads to a recovery of such valuable ingredients as may be present in the white water, including not only precipitant but latex-serum constituents, such as the proteins and resins, that may have a favorable influence on the ageing and/or bonding qualities of the rubber. By using white water as the diluent for the latex and/or the precipitant added thereto, and by using white water as the aqueous vehicle in the beater engine and in subsequently diluting the beaten suspension of fibers, it is possible to operate with a white-water system largely, if not practically entirely, closed. The re-use of most or practically all of the white water is of especial significance in those instances when it is desired to incorporate pursuant to my invention a comparatively large amount of rubber, say, about 30% or more of rubber, based on the weight of dry fiber, into the finished product, since the production of a dilute rubber precipitate, such as hereinbefore described, requires enormous quantities of water. In other words, the use of fresh water as the diluent for the rubber precipitate would not only give rise to the necessity of discarding a corresponding amount of white water but the discarded white water would carry away therewith the valuable ingredients already mentioned. The present invention thus affords an economical and eminently practicable method of attaining the desired quality of rubber-reenforced waterlaid webs of interfelted fibers even at high rubber contents.

Before entering upon a discussion of the practice of my process as a whole, it is well to dwell upon the sort of rubber latices that I use as raw material and the conditions under which the rubber is precipitated therein to produce the kind of rubber precipitate useful for the purposes of my invention. The latex serving as raw material may be any one of the various latices now on the market, including ammonia-preserved latex of normal solids content, so-called creamed or centrifuged latices of super-normal solids content, and vulcanized latex at suitable solids content. In some instances, the ordinary ammonia-preserved rubber latex may be compounded with the usual rubber-compounding agents, such as sulphur, zinc oxide, accelerators of vulcanization, anti-oxidants, dyes, or pigments preparatory to undergoing the action of a precipitant. Accordingly, when I use the term "rubber latex" in the following description and in the appended claims, I mean any one or a mixture of the latices mentioned and/or artificial aqueous rubber dispersions partaking of the qualities of natural rubber latex and/or aqueous dispersions of synthetic compounds that have rubber-like properties. Typical of the last-mentioned aqueous dispersions are those of the chlorinated and polymerized butadienes available under the trade-mark "Duprene" and those of the polymerized reaction products prepared by treating olefines with polysulphides and available under the trade-mark "Thiokol". Starting with a rubber latex of a solids content vastly greater than that desired in the rubber precipitate that is to be commingled with the aqueous suspension of fibers, I can proceed to dilute such latex with water to produce a composition whose solids content approaches that desired in the aqueous suspension of the rubber precipitate. The diluted latex is then treated with a solution of suitable precipitant under conditions of precipitant concentration and dilution designed to yield a rubber precipitate of the proper particle size, namely, a particle size such that the particles are readily entrained in the fibers of the pulp suspension as they are being interfelted on the wire of the web-forming machine with little, if practically any, washing out of rubber in the water draining from the wire. As already indicated, such a rubber precipitate may be delivered as a continuously flowing stream in controlled amount into the stream of fully conditioned pulp suspension immediately before the suspension is delivered to the web-forming machine, the mixed stream completing its journey to the felt-making machine without any troublesome fouling of the instrumentalities which it encounters.

A more complete understanding of the present invention may be had from the following description of a specific application thereof which is illustrated conventionally and diagrammatically on the accompanying drawing. Assuming that the latex used as raw material is the ordinary ammonia-preserved latex of commerce of about 33% to 40% solids content, one may aerate or otherwise treat the latex for the purpose of largely or substantially completely destroying its ammonia content, thereby facilitating the production of a rubber precipitate of the desired character. As illustrated in the drawing, the latex may then be delivered into a mixing tank 8 wherein it is mixed with the desired volume of diluting water, preferably white water emanating from the web-forming machine indicated as a whole by the numeral 11. The dilution of the latex may be such as to lower its solids content to about 1% to 2%. The diluted latex may be withdrawn from the tank 8 by a pump 9 and delivered through a pipe 10 to a precipitating tank 12 whereinto a solution of suitable precipitant may be added for the purpose of producing a rubber precipitate of the desired particle size. To this end, a dilute solution of alum, say, of 1% to 3% concentration may be added to the precipitating tank in suitable amount, for instance, in amount that does not add appreciably to the water content of the rubber precipitate. The dilution of the latex in the tank 8 and its treatment with precipitant in the tank 12 may be carried on continuously, latex and diluting water being progressively fed into the tank 8 and precipitating solution being progressively fed into the tank 12 so as to permit of a progressive withdrawal of a stream of rubber precipitate at a concentration of about 1% from the tank 12. As shown, the withdrawal of a progressively flowing stream of rubber from the tank 12 is effected by a gooseneck pipe 13 rising from the bottom of the tank and discharging outside of the tank into a funnel 14 which serves as the receiving end of a pipe 15 through which the rubber precipitate may be delivered for mixing with the aqueous pulp suspension. The dimensions of the tank 12 are so chosen that sufficient time is afforded the mixture of latex and precipitant in their passage through the tank to permit the particles of precipitated rubber to grow to the desired size for proper retention by the fibers. In other words, I maintain in effect a bulk supply of a dilute suspension of precipitated rubber in the tank 12, to which bulk supply I progressively feed latex, diluting water, and precipitant while I progressively withdraw from such supply a dilute suspension of precipitated rubber at a rate such that the particles of precipitated rubber have an opportunity to grow in the bulk supply to a size retainable by the fibers of the aqueous fiber suspension with which they are subsequently mixed. The aqueous pulp suspension beaten and/or otherwise conditioned for web-making is depicted as flowing into a pipe 16 wherein such suspension is commingled with the rubber precipitate coming from the pipe 15. This commingling may take place just before the mixture enters into a centrifugal pump 17 which serves to transfer the mixture as a continuously moving stream by way of a pipe 18 to the head-box of the web-forming machine 11. The web-forming machine depicted for purpose of illustration is a so-called cylinder machine, although, it is, of course, possible to use a Fourdrinier machine or any other paper-making instrumentality. The mixture of fiber and rubber precipitate deposits, as ordinarily, as a web or layer on the cylinder mold 19 of the machine, which may be equipped with a couch roll and transfer felt (not shown) for carrying the web or layer to its destination. The white water drained and/or sucked inside of the cylinder mold is shown as gravitating through a pipe 20, whence the desired proportion of such water may be taken by a pump 21 and sent through a pipe 22 to the tank 8 as a diluent for the latex being supplied to such tank. If desired, part of the white water may be diverted into the pipe 16 and serve to dilute the mixture of fiber suspension and rubber precipitate to the desired web-forming consistency. Some of the white water may also serve as the solvent or diluent for the alum or other precipitant supplied to the tank 12. If need be, some white water may be bled away from the pump 21 by way of a bleed pipe 23 so as to avoid accumulation of white water in the system.

In producing a rubber-reenforced waterlaid web of fibers such as has leather-like properties and is suitable for making certain shoe parts, one may adopt generally the following conditions of practical operation. Rags, wood pulp, or similar cellulose fibers may be beaten to a well gelatinized state in the beater engine. The stock which may be delivered from the beater chest at a stock concentration of about 4% may, after commingling with the dilute rubber precipitate and with more of the white water, have a fiber content of, say, about 0.5%, at which fiber content good web formation may be realized. Substantially uniformly mixed with the fiber as it is depositing on the cylinder mold or other web-forming instrumentality may be approximately one-half the weight of rubber precipitate, the particles of which become entrained with the fibers as they undergo progressive deposition upon the wire. The rubber precipitate as it is mixed with the beaten stock may have a solids content of about 2%.

The rubber-reenforced web taken from the web-forming instrumentality is dried and, if desired, calendered to consolidate the rubber and fibers. The drying and/or calendering operations may be performed at sufficiently elevated temperature to vulcanize the rubber, assuming that vulcanizing ingredients have previously been compounded therewith. The rubber-reenforced web may be bonded with one or more similar webs into a laminated product of any desired thickness, the contacting faces of the webs being coated with rubber latex or other suitable adhesive, if necessary. Thus, when the rubber-reenforced web is made on a cylinder machine, it may be convoluted on the make-up roll of the machine into a tube of the desired wall thickness and the tube then removed as such or cut axially of the roll and stripped as a sheet. Rubber latex or other suitable adhesive may, if needed, be applied as in the form of a spray to the rubber-reenforced web as it is being convoluted so as to unite the plies or laminae. The resulting laminated product is then dried and, if desired, calendered. Of course, a laminated product may be formed on a multi-cylinder machine or by uniting two or more rubber-reenforced webs fabricated on a Fourdrinier machine or other paper-making instrumentality.

In practicing my invention, it is to be observed that I precipitate the rubber content of ammonia-preserved rubber latex in the substantial absence of added stabilizers other than the ammonia. Indeed, not only do I prefer to destroy in large measure the ammonia content of the rubber latex, as by aeration, before I treat the latex with the precipitant, but I accomplish the precipitation of the rubber in the presence of a large amount of diluting water that tends to decrease the stabilizing influence of such stabilizers as naturally occur in the latex or of such ammonia as may be present therein. This means that precipitation of the rubber at the desired particle size may be readily realized and that the resulting rubber precipitate does not carry added stabilizers or their reaction products in amount such as might impair the usefulness of the finished rubber-reenforced products made in accordance with my invention.

The principles of the present invention extend to aqueous dispersions or solutions of materials other than rubber which are useful as paper-making or web-reenforcing ingredients but which, unless precipitated under controlled conditions, may lead to curdy or gelatinous masses that are troublesome in paper-making practice. This is true, for example, of viscose or cellulose xanthate solution which is sometimes desired as a sizing ingredient in paper or used to impart high wet strength thereto, the cellulose xanthate being decomposed to yield regenerated cellulose when it is incorporated into the paper-making stock and/or when the paper is put through drying under heat. In such case, it is important to avoid treating the viscose or cellulose xanthate solution with precipitant under conditions of cellulose concentration such that large gobs or masses of gelatinous precipitate tend to form therein. This can be done by adopting the practice that I have hereinbefore described as being applicable to rubber latex. Indeed, it is desirable in working with viscose solution to dilute such solution with water to a cellulose content (in the form of cellulose xanthate) of even less than 1% as it is being treated with a precipitant, which may, to advantage, be a dilute sulphuric acid solution, say, one of 1% to 2% strength. Under such conditions, the cellulose xanthate solution undergoes precipitation and/or decomposition to form particles of the desired size for uniformly mixing with and retention by a paper-making or web-making furnish, the mixture being substantially free from large gobs or masses that tend to foul equipment and detract from the uniformity of the finished product. The re-use of white water and the other features hereinbefore outlined are also of value as applied to cellulose xanthate solutions and to other aqueous solutions or dispersions that tend to throw out curds or gelatinous masses under some conditions of precipitation, for instance, when such solutions or dispersions are precipitated at unduly high solids content.

In working with dilute mixtures of fiber and precipitated rubber, I have noticed a tendency for the precipitate to float to the surface of the mixture and to form a scum that sticks to the walls of the vats, head-box, and other instrumentalities. Inasmuch as such a tendency gives rise to the accumulation on such walls of sticky, messy clots that represent lost rubber, I have taken steps to do away with such tendency. It is natural for rubber precipitated from rubber latex to float, since such rubber is lower in specific gravity than water, but I have found that by precipitating rubber from the latex in the presence of material that tends to sink in water, it is possible to produce a rubber precipitate that has no tendency to float. In accordance with the present invention, therefore, it is possible to precipitate rubber from the latex in the presence of one or more materials, such as rubber-compounding agents, that tend to sink in water, for instance, such materials as finely ground raw umber or such rubber-compounding agents as finely ground zinc oxide, titanium oxide, litharge, sulphur, etc. When this is done, the precipitated rubber evidently entraps the material so as to tend to sink with it. It is possible to produce a precipitated rubber that settles comparatively rapidly by employing a quantity of material that is of sufficient specific gravity or heaviness relative to the precipitated rubber. Thus, latex was diluted with white water containing a slight quantity of alum and acetic acid to a rubber solids content of 4%. To the mixture was then added finely ground raw umber to the extent of about 50% of the weight of the rubber solids. When to the mixture was added with stirring 3% of paper maker's alum, based on rubber solids, in the form of a 5% solution, the resulting curd-free rubber precipitate settled comparatively rapidly, leaving a clear supernatant liquid. The same experience was encountered when the umber was replaced with finely ground zinc oxide, titanium oxide, litharge, and a colloidal sulphur emulsion precipitable with alum. The precipitated rubber no longer tended to float and/or to accumulate in the vats, head-box, or other instrumentalities.

A similar improvement was noted when the relatively heavy material was first added to the pulp and the separately precipitated rubber was then admixed therewith, the rubber in this case apparently adsorbing or otherwise retaining or entraining the particles of heavy material. The precipitation of rubber in the presence of the heavy material is, however, to be preferred, for the results are more positive and more easily controlled. Accordingly, I may, as shown on the accompanying drawing, feed through a pipe 24 leading to the diluting tank 8 a slurry of one or more of the heavy materials hereinbefore mentioned in measured amount so that the latex going to the precipitating tank 12 will have its rubber content precipitated therefrom in the presence of material that prevents floating of the precipitated rubber particles. The amount of such heavy material added to the latex is preferably controlled so that the rubber precipitated in the tank 8 not only has no tendency to float but has a specific gravity only slightly greater than unity and so does not tend to settle out from suspension in water.

I claim:—

1. In a process of manufacturing a waterlaid product into which enter as raw materials an aqueous suspension of fibers and an aqueous composition of precipitable solids that tends to throw out curds or gelatinous masses under some conditions of precipitation, those steps which comprise precipitating the solids of such aqueous composition in the presence of sufficient diluting water to form a precipitate substantially free from curds or gelatinous masses, mixing such diluted precipitate with the aqueous suspension of fibers to disseminate such precipitate substantially uniformly throughout the suspension, forming a waterlaid product from the mixture, and recovering and reusing the water removed during the formation of such product as the diluting water for the aqueous composition of precipitable solids entering into the process.

2. In a process of manufacturing a waterlaid product into which enter as raw materials an aqueous suspension of fibers and an aqueous composition of precipitable solids that tends to throw out curds or gelatinous masses under some conditions of precipitation, those steps which comprise precipitating the solids of such aqueous composition in the presence of sufficient diluting water to form a precipitate diluted with water to a solids content not exceeding about 2% and substantially free from curds or gelatinous masses, mixing such diluted precipitate with an aqueous suspension of fibers to produce a mixture having a fiber content not exceeding about 2%, and forming a waterlaid product from the mixture.

3. In a process of manufacturing a waterlaid product into which enter as raw materials an aqueous suspension of fibers and an aqueous composition of precipitable solids that tends to throw out curds or gelatinous masses under some conditions of precipitation, those steps which comprise precipitating the solids of such aqueous composition in the presence of sufficient diluting water to form a precipitate diluted with water to a solids content not exceeding about 2% and substantially free from curds or gelatinous masses, mixing such diluted precipitate with the aqueous suspension of fibers to produce a mixture having a fiber content not exceeding about 2%, forming a waterlaid product from the mixture, and recovering and reusing the water removed during the formation of such product as the diluting water for the precipitable aqueous composition entering into the process.

4. In the manufacture of a rubber-reenforced waterlaid web of fibers involving the use of rubber latex as the source of the rubber reenforcement, those steps which comprise precipitating the rubber content of the latex in the presence of sufficient water to form a rubber precipitate diluted with water to a rubber content not exceeding about 2%, progressively mixing a stream of such diluted rubber precipitate with a stream of an aqueous suspension of fibers to produce a mixed stream having a fiber content not exceeding about 2%, and progressively delivering the mixed stream to a web-forming machine.

5. In a process of manufacturing a rubber-reenforced waterlaid web of fibers involving the use of ammonia-preserved rubber latex as the source of the rubber reenforcement, those steps which comprise precipitating the rubber content of the latex in the substantial absence of added stabilizers other than the ammonia but in the presence of a considerable amount of diluting water, mixing such diluted rubber precipitate with an aqueous suspension of fibers to disseminate such rubber precipitate substantially uniformly throughout the suspension, and forming the mixture into a waterlaid web.

6. In a process of manufacturing a rubber-reenforced waterlaid web of fibers involving the use of ammonia-preserved rubber latex as the source of the rubber reenforcement, those steps which comprise at least partially destroying the ammonia content of the latex, precipitating the rubber content of the latex in the substantial absence of added stabilizers other than the ammonia but in the presence of a considerable amount of diluting water, mixing such diluted rubber precipitate with an aqueous suspension of fibers to disseminate such rubber precipitate substantially uniformly throughout the suspension, and forming the mixture into a waterlaid web.

7. In a process of manufacturing a rubber-reenforced waterlaid web of fibers involving the use of ammonia-preserved rubber latex as the source of the rubber reenforcement, those steps which comprise precipitating the rubber content of the latex in the substantial absence of added stabilizers other than the ammonia but in the presence of a considerable amount of diluting water, mixing such diluted rubber precipitate with an aqueous suspension of fibers to disseminate such rubber precipitate substantially uniformly throughout the suspension, forming the mixture into a waterlaid web, and recovering and reusing the water removed during the formation of the web as the diluting water for the latex entering into the process.

8. In a process of manufacturing a rubber-reenforced waterlaid web of fibers involving the use of rubber latex as the source of the rubber reenforcement, those steps which comprise precipitating the rubber content of the latex in the presence of a precipitant and diluting water, mixing such diluted precipitate with an aqueous suspension of fibers to disseminate such precipitate substantially uniformly throughout the suspension, forming the mixture into a waterlaid web, and recovering and reusing the water removed during the formation of the web as the diluting water for the latex entering into the process.

9. In a process of manufacturing a rubber-reenforced waterlaid web of fibers involving the use of rubber latex as the source of the rubber reenforcement, those steps which comprise precipitating the rubber content of the latex in the presence of a precipitant and sufficient diluting water to form a rubber precipitate diluted with water to a solids content not exceeding about 2% and substantially free from curds, progressively mixing a stream of such diluted rubber precipitate with a stream of an aqueous suspension of fibers to produce a mixed stream having a fiber content not exceeding about 2%, progressively delivering the mixed stream to a web-forming machine, and recovering and reusing the water removed during the formation of the web as the diluting water for the latex entering into the process.

10. In a process of manufacturing a rubber-reenforced waterlaid web of fibers involving the use of rubber latex as the source of the rubber reenforcement, those steps which comprise precipitating the rubber content of the latex in the presence of a precipitant and sufficient diluting water to form a rubber precipitate diluted with water to a solids content not exceeding about 2% and substantially free from curds, progressively mixing a stream of such diluted rubber precipitate with a stream of an aqueous suspension of well beaten cellulose pulp to produce a mixed stream having a fiber content not exceeding about 2% and a rubber content of at least about 30% based on the weight of dry fiber, and progressively delivering the mixed stream to a web-forming machine.

11. In a process of manufacturing a rubber-reenforced waterlaid web of fibers involving the use of rubber latex as the source of the rubber reenforcement, those steps which comprise precipitating the rubber content of the latex in the presence of a precipitant and sufficient diluting water to form a rubber precipitate diluted with water to a solids content not exceeding about 2% and substantially free from curds, progressively mixing a stream of such diluted rubber precipitate with a stream of an aqueous suspension of well beaten cellulose pulp to produce a mixed stream having a fiber content not exceeding about 2% and a rubber content of at least about 30% based on the weight of dry fiber, progressively delivering the mixed stream to a web-forming machine, and recovering and reusing the water removed during the formation of the web as the diluting water for the latex entering into the process.

12. In a process of manufacturing a rubber-reenforced waterlaid product into which enter as raw materials an aqueous suspension of fibers and rubber latex, those steps which comprise precipitating the rubber content of the latex in the presence of considerable diluting water, allowing the particles of precipitated rubber to grow to a size retainable by the fibers of such aqueous suspension, mixing the resulting suspension of precipitated rubber with such aqueous suspension of fibers, and forming the mixture into a waterlaid product.

13. In a process of manufacturing a rubber-reenforced waterlaid web of fibers involving the use of rubber latex as the source of the rubber reenforcement, those steps which comprise maintaining a bulk supply of a dilute suspension of precipitated rubber, progressively feeding latex, diluting water, and precipitant to such bulk supply, progressively withdrawing a dilute suspension of precipitated rubber from such bulk supply, progressively mixing the withdrawn suspension of precipitated rubber with a stream of an aqueous suspension of fibers, and progressively delivering the mixed stream to a web-forming machine.

14. In a process of manufacturing a rubber-reenforced waterlaid web of fibers into which enter as raw materials an aqueous suspension of fibers and rubber latex, those steps which comprise maintaining a bulk supply of a dilute suspension of precipitated rubber, progressively feeding latex, diluting water, and precipitant to such bulk supply, progressively withdrawing a dilute suspension of precipitated rubber from such bulk supply at a rate such that the particles of precipitated rubber have had an opportunity to grow in such bulk supply to a size retainable by the fibers of such aqueous suspension, progressively mixing the withdrawn suspension of precipitated rubber with a stream of such aqueous suspension of fibers, and progressively delivering the mixed stream to a web-forming machine.

15. In the manufacture of a rubber-reenforced waterlaid product into which enter as raw materials an aqueous suspension of fibers and rubber latex, those steps which comprise precipitating the rubber content of the latex in the presence of diluting water and sufficient material that tends to sink in water to produce a rubber precipitate having no tendency to float, admixing the resulting precipitated rubber with the aqueous suspension of fibers, and forming a waterlaid product from the mixture.

16. In the manufacture of a rubber-reenforced waterlaid product from an aqueous suspension of fibers and a suspension of rubber precipitated from rubber latex, those steps which comprise mixing such suspensions in the presence of sufficient material that tends to sink in water to destroy the tendency of the precipitated rubber to float, and forming a waterlaid product from the mixture.

17. In the manufacture of a rubber-reenforced waterlaid product into which enter as raw materials an aqueous suspension of fibers and rubber latex, those steps which comprise precipitating the rubber content of the latex in the presence of diluting water and sufficient material that tends to sink in water to produce a rubber precipitate that has a specific gravity only slightly greater than unity, admixing the resulting precipitated rubber with the aqueous suspension of fibers, and forming a waterlaid product from the mixture.

18. In the manufacture of a rubber-reenforced waterlaid product from an aqueous suspension of a mixture of fibers and rubber precipitated from rubber latex, that step which comprises introducing into the precipitated rubber sufficient material having a specific gravity greater than unity to increase the specific gravity of the precipitated rubber to a value only slightly greater than unity prior to producing a waterlaid product from such mixture.

19. In a process of manufacturing a rubber-reenforced waterlaid product into which enter as raw materials an aqueous suspension of fibers and rubber latex, those steps which comprise precipitating the rubber content of the latex in the presence of considerable diluting water and of sufficient material that tends to sink in water to produce a rubber precipitate having no tendency to float, allowing the particles of precipitated rubber to grow to a size retainable by the fibers of such aqueous suspension, mixing the resulting suspension of precipitated rubber with such aqueous suspension of fibers, and forming the mixture into a waterlaid product.

20. In a process of manufacturing on a papermaking machine a rubber-reenforced waterlaid web of fibers into which enter as raw materials an aqueous suspension of fibers and rubber latex, those steps which comprise transforming the rubber content of rubber latex in the presence of considerable diluting water into an aqueous suspension of precipitated rubber particles of a size retainable by the fibers of such aqueous suspension of fibers when admixed with such latter suspension and the admixture is deposited on the wire of the papermaking machine, progressively feeding a stream of the aqueous suspension of fibers to the papermaking machine, progressively admixing with such last-named stream on its way to the papermaking machine a stream of such aqueous suspension of precipitated rubber particles, and progressively delivering the admixture to the papermaking machine.

21. In a process of manufacturing on a papermaking machine a rubber-reenforced waterlaid web of fibers into which enter as raw materials an aqueous suspension of fibers and rubber latex, those steps which comprise transforming the rubber content of rubber latex in the presence of diluting water into an aqueous suspension of precipitated rubber of a solids content not exceeding about 2% and of a particle size retainable by the fibers of such aqueous suspension of fibers when admixed with such latter suspension and the admixture is deposited on the wire of the papermaking machine, progressively feeding a stream of the aqueous suspension of fibers to the papermaking machine, progressively admixing with such last-named stream on its way to the papermaking machine a stream of such aqueous suspension of precipitated rubber to produce a mixed stream having a fiber content not exceeding about 2%, and progressively delivering the admixture to the papermaking machine.

22. In a process of manufacturing on a papermaking machine a rubber-reenforced waterlaid web of fibers into which enter as raw materials an aqueous suspension of fibers and rubber latex, those steps which comprise transforming the rubber content of rubber latex in the presence of diluting water into an aqueous suspension of precipitated rubber of a solids content not exceeding about 2% and of a particle size retainable by the fibers of such aqueous suspension of fibers when admixed with such latter suspension and the admixture is deposited on the wire of the papermaking machine, progressively feeding a stream of the aqueous suspension of fibers to the papermaking machine, progressively admixing with such last-named stream on its way to the papermaking machine a stream of such aqueous suspension of precipitated rubber to produce a mixed stream having a fiber content not exceeding about 2% and a rubber content of at least about 30%, based on the dry weight of fiber, and progressively delivering the admixture to the papermaking machine.

23. In a process of manufacturing on a papermaking machine a rubber-reenforced waterlaid web of fibers involving the progressive delivery to the machine of a mixed fiber-rubber suspension, that practice which comprises separately preparing an aqueous suspension of fibers and an aqueous suspension of precipitated latex solids of a particle size retainable by the fibers of such aqueous suspension of fibers when admixed with such latter suspension and the admixture is deposited on the wire of the papermaking machine, progressively feeding and merging as streams the separately prepared aqueous suspensions, and progressively delivering the merged suspensions to the papermaking machine.

24. In a process of manufacturing on a papermaking machine a rubber-reenforced waterlaid web of fibers involving the progressive delivery to the machine of a mixed fiber-rubber suspension, that practice which comprises separately preparing an aqueous suspension of fibers and an aqueous suspension of precipitated latex solids of a solids content not exceeding about 2% and of a particle size retainable by the fibers of such aqueous suspension of fibers when admixed with such latter suspension and the admixture is deposited on the wire of the papermaking machine, progressively feeding and merging as streams the separately prepared aqueous suspensions to produce merged suspensions of a fiber content not exceeding about 2%, and progressively delivering the merged suspensions to the papermaking machine.

25. In a process of manufacturing on a papermaking machine a rubber-reenforced waterlaid web of fibers involving the progressive delivery to the machine of a mixed fiber-rubber suspension, that practice which comprises separately preparing an aqueous suspension of fibers and an aqueous suspension of precipitated latex solids of a solids content not exceeding about 2% and of a particle size retainable by the fibers of such aqueous suspension of fibers when admixed with such latter suspension and the admixture is deposited on the wire of the papermaking machine, progressively feeding and merging as streams the separately prepared aqueous suspensions to produce merged suspensions of a fiber content not exceeding about 2% and a rubber content of at least about 30%, based on the dry weight of fiber, and progressively delivering the merged suspensions to the papermaking machine.

26. In a process of manufacturing a waterlaid product into which enter as raw materials an aqueous suspension of fibers and rubber latex, those steps which comprise precipitating the solids content of the latex in the presence of sufficient diluting water to form a precipitate diluted with water to a solids content not exceeding about 2% and substantially free from curds or gelatinous masses, mixing such diluted precipitate with an aqueous suspension of fibers to produce a mixture having a fiber content not exceeding about 2%, and forming a waterlaid product from the mixture.

MILTON O. SCHUR.